United States Patent [19]

Haydt

[11] Patent Number: 5,136,718

[45] Date of Patent: Aug. 4, 1992

[54] COMMUNICATIONS ARRANGEMENT FOR DIGITAL DATA PROCESSING SYSTEM EMPLOYING HETEROGENEOUS MULTIPLE PROCESSING NODES

[75] Inventor: Robert J. Haydt, Worcester, Mass.

[73] Assignee: Digital Equipment Corporation, Maynard, Mass.

[21] Appl. No.: 563,960

[22] Filed: Aug. 6, 1990

Related U.S. Application Data

[63] Continuation of Ser. No. 93,474, Sep. 4, 1987, abandoned.

[51] Int. Cl.$^5$ ............... G06F 13/00; G06F 12/00
[52] U.S. Cl. .................. 395/800; 395/425
[58] Field of Search ... 364/200 MS File, 900 MS File

[56] References Cited

U.S. PATENT DOCUMENTS

| | | | |
|---|---|---|---|
| 4,095,054 | 6/1978 | Anizan et al. | 179/18 |
| 4,145,739 | 3/1979 | Dunning et al. | 364/200 |
| 4,197,427 | 4/1980 | Hutcheson et al. | 179/18 |
| 4,229,624 | 10/1980 | Haben et al. | 179/18 |
| 4,320,455 | 3/1982 | Woods et al. | 364/200 |
| 4,354,229 | 10/1982 | Davis et al. | 364/200 |
| 4,394,725 | 7/1983 | Bienvenu et al. | 364/200 |
| 4,404,628 | 9/1983 | Angelo | 364/200 |
| 4,447,874 | 5/1984 | Bradley et al. | 364/200 |
| 4,449,182 | 5/1984 | Rubinson et al. | 364/200 |
| 4,491,909 | 1/1985 | Shimizu | 364/200 |
| 4,538,224 | 8/1985 | Peterson | 364/200 |
| 4,546,430 | 10/1985 | Moore et al. | 364/200 |
| 4,567,562 | 1/1986 | Fassbender | 364/200 |
| 4,589,063 | 5/1986 | Shah et al. | 364/200 |
| 4,590,556 | 5/1986 | Berger et al. | 364/200 |
| 4,630,258 | 12/1986 | McMillen et al. | 370/94 |
| 4,633,039 | 12/1986 | Holden | 379/32 |
| 4,654,821 | 3/1987 | Lapp | 364/900 |
| 4,663,707 | 5/1987 | Dawson | 364/200 |
| 4,674,033 | 6/1987 | Miller | 364/200 |
| 4,675,865 | 6/1987 | DeVries et al. | 370/85 |
| 4,694,452 | 9/1987 | Beckinger et al. | 370/58 |
| 4,698,772 | 10/1987 | Carter et al. | 364/900 |
| 4,724,521 | 2/1988 | Carron et al. | 364/300 |
| 4,725,834 | 2/1988 | Chang et al. | 370/85 |
| 4,727,538 | 2/1988 | Furchtgott et al. | 370/85 |
| 4,752,870 | 6/1988 | Matsumura | 364/200 |
| 4,777,595 | 10/1988 | Strecker et al. | |
| 4,783,730 | 11/1988 | Fischer | 364/200 |
| 4,807,111 | 2/1989 | Cohen et al. | 364/200 |
| 4,821,185 | 4/1989 | Esposito | 364/200 |
| 4,862,354 | 8/1989 | Fiacconi et al. | 364/200 |
| 4,896,289 | 1/1990 | Svinicki et al. | 364/900 |
| 4,914,570 | 4/1990 | Peacock | 364/200 |
| 4,914,576 | 4/1990 | Zelley et al. | 368/200 |
| 4,951,193 | 8/1990 | Muramatsu et al. | 364/200 |

Primary Examiner—Alyssa H. Bowler
Attorney, Agent, or Firm—Fish & Richardson

[57] ABSTRACT

A distributed digital data processing system includes a host system and a plurality of nodes interconnected by a common bus. The host maintains a common queue buffer which is used to contain queues each associated with a node for transferring messages transferred among all of the nodes in the system. The queue buffer is identified by a common system descriptor block. To perform a transfer, the nodes access the system descriptor block to determine the location of the queue buffer from the common system descriptor block and inserts a message in a queue entries and links it to the queue associated with the intended recipient.

53 Claims, 6 Drawing Sheets

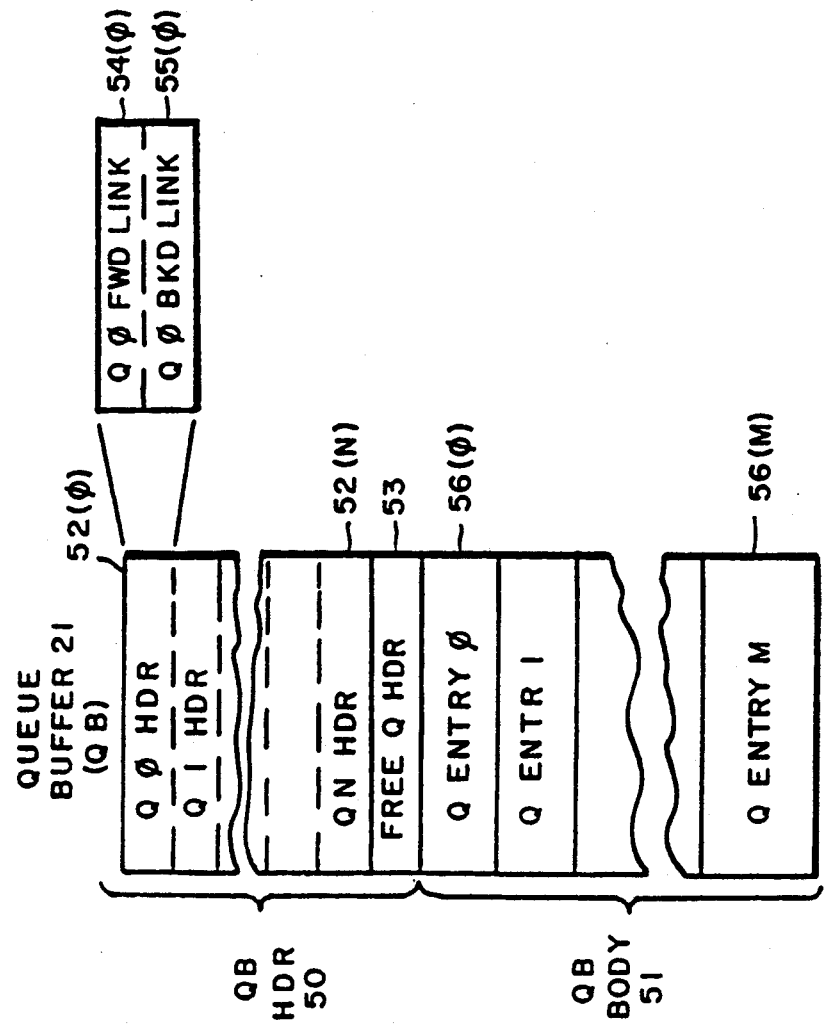
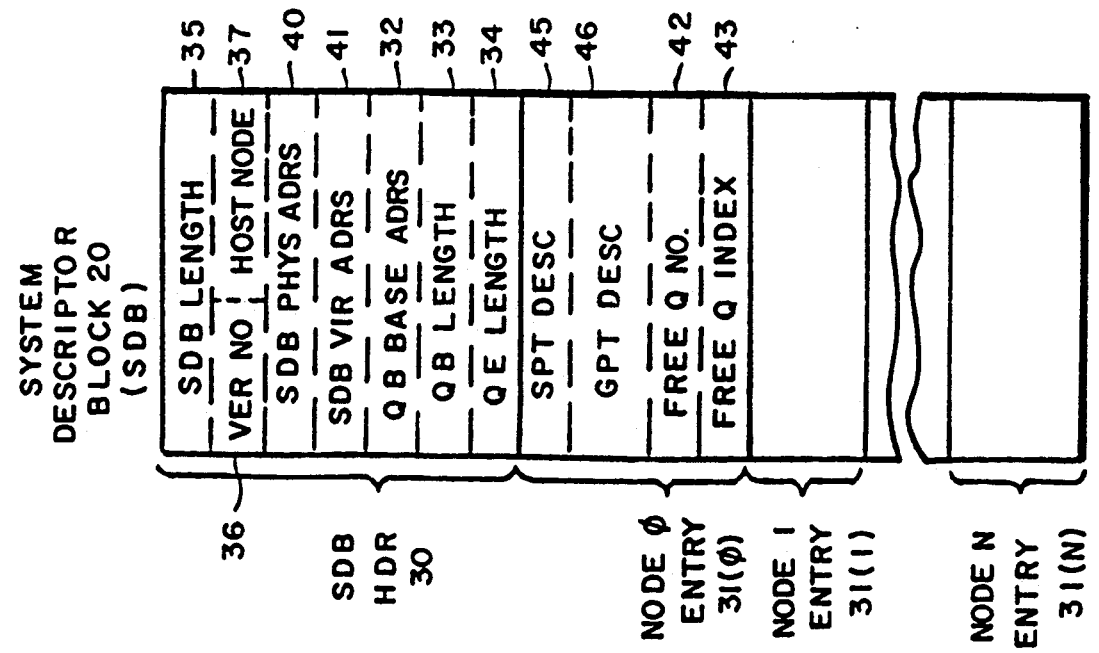
FIG.2B
FIG.2A

COMMUNICATIONS CONTROL AND STATUS REGISTERS 15
FIG. 3A
CONTROL REGISTER 100
FIG. 3B
ATTENTION REGISTER 107
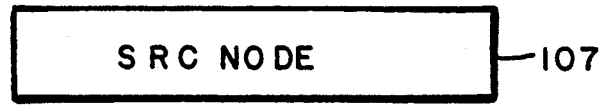
FIG. 3C
STATUS REGISTER 101
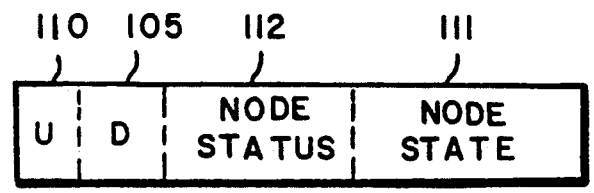
FIG. 3D
DATA REGISTER 102
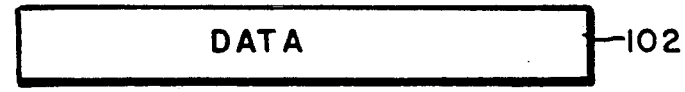
FIG. 3E
ERROR REGISTER 103
FIG. 3

INSERTION BY NODE A OF MESSAGE
IN A QUEUE ENTRY 56 IN QUEUE
ASSOCIATED WITH NODE B IN QUEUE
BUFFER 21, GIVEN SOURCE AND
DESTINATION NODE IDENTIFICATION

170 USING SDB BASE ADRS IN ITS DATA
REG 102, NODE A RETRIEVES QUEUE BUFFER
BASE ADRS AND LENGTH FIELDS 32,33 AND 34
AND CONTENTS OF NODE B'S FREE Q NO.
AND INDEX FIELDS 42 AND 43 FROM SDB

171 USING DESTINATION NODE IDENTIFICATION
AND QUEUE BUFFER BASE ADRS, NODE A
RETRIEVES CONTENTS OF NODE B'S
QUEUE HEADER 52

172 USING QUEUE BUFFER BASE ADRS AND FREE
QUEUE INDEX, NODE A RETRIEVES CONTENTS
OF FREE QUEUE HEADERS 53

YES 173 ARE THERE ANY QUEUE ENTRIES IN
THE FREE QUEUE ?

NO

174 ERROR

175 NODE A LOADS MESSAGE IN THE FIRST QUEUE
ENTRY IN FREE QUEUE

176 NODE A CONDITIONS NODE B'S QUEUE
HEADER 52 AND FREE QUEUE HEADER AND
THE APPROPRIATE QUEUE ENTRY LINKS 60
TO LINK QUEUE ENTRY TO NODE B'S QUEUE

FIG.4A-1    (A)

RETRIEVAL BY NODE B OF COMMAND OR
RESPONSE IN A QUEUE ENTRY 56 IN
QUEUE BUFFER 21

FROM FIG. 4C-2 — (B)

190 NODE B DETERMINES THAT IT HAS BEEN INITIALIZED AND IS OPERATING → NO

↓ YES

191 NODE B DETERMINES IF A VALUE HAS BEEN LOADED IN THE ATTENTION REGISTER → NO (C) ─────→ ↓ YES

192 USING SDB BASE ADRS IN ITS DATA REG 102, NODE B RETRIEVES QUEUE BUFFER BASE ADRS AND LENGTH FIELDS 32, 33 AND 34 AND CONTENTS OF NODE B'S FREE Q NO. AND INDEX FIELDS 42 AND 43 FROM SDB

↓

193 USING RETRIEVED QUEUE BUFFER BASE ADRS AND NODE B'S NODE IDENTIFICATION, NODE B RETRIEVES CONTENTS OF NODE B'S QUEUE HEADER 52

↓

NO  194 NODE B TESTS QUEUE HEADER TO DETERMINE IF QUEUE IS EMPTY

↓ YES (B) FIG. 4B-1

197 USING RETRIEVED CONTENTS OF ITS QUEUE HEADER, NODE B RETRIEVES CONTENTS OF FIRST ENTRY 56 IN QUEUE IDENTIFIED BY RETRIEVED QUEUE HEADER 52

↓

200 NODE B CONDITIONS ITS QUEUE HEADER 52, FREE QUEUE HEADER 53 AND QUEUE ENTRY 56 TO LINK QUEUE ENTRY TO FREE QUEUE

177 WAS NODE B'S QUEUE PREVIOUSLY EMPTY — NO →

↓ YES

178 CONDITION NODE B'S ATTENTION REG

↓

179 EXIT

FIG.4A-2

203 NODE B PROCESSES MESSAGE IN RETRIEVED CONTENTS OF QUEUE ENTRY 56

↓

204 HAS HOST LOADED STOP COMMAND IN CONTROL REG 100 — NO →

↓ YES (B) FIG.4B-1

205 NODE B TESTS ITS QUEUE HEADER 52 TO DETERMINE IF ITS QUEUE IS EMPTY — NO →

↓ YES (B) FIG.4B-1

COMMUNICATIONS ARRANGEMENT FOR DIGITAL DATA PROCESSING SYSTEM EMPLOYING HETEROGENEOUS MULTIPLE PROCESSING NODES

This is a continuation of copending application Ser. No. 07/093,474 filed on Sept. 4, 1987, now abandoned.

BACKGROUND OF THE INVENTION

1. Field of the Invention

The invention relates generally to the field of digital data processing systems and more specifically to communications mechanisms for facilitating communications among nodes in a system employing multiple nodes.

2. Description of the Prior Art

In the past, digital data processing systems, or computers, were large and expensive systems including one or only a few central processor units connected to a main memory, mass storage such as disk and tape units, and input/output units such as printers, video display terminals, and telecommunication links. Because of the cost of such systems, they typically supported a number of users, and a significant amount of design effort went into making them faster. However, as more parts of the computers were put onto integrated circuit chips, including entire central processor units, the cost of computers declined dramatically, and so it became cost effective in many applications to devote a single computer to one or only a few users.

A benefit of having all users using a single large computer system is that data and programs may be shared among a number of users. This benefit can also be realized in an environment of smaller computers if they are linked together, for example, to form a distributed system. In a distributed system, the system is controlled by a host computer which provides services to the smaller computers, which are termed "nodes", such as data and program sharing, scheduling of resources such as printers, backup storage, and the like.

A problem arises, however, in facilitating communications among nodes, that is, in allowing nodes to initiate transfers of information, comprising data and programs, to and from other nodes. In the past, information transfers were asymmetric, that is, the host generated commands, which were performed by the nodes, and the nodes generated responses. In such systems, the host maintained a set of queues for each node, each queue including a command queue, a response queue and a message queue. The host loaded commands into the command queue and the node processed each command and inserted a response into the response queue. If the node required service from the host, but not in response to a command, it loaded a message into the message queue. The host received the message and provided the required service. The information was actually transferred in buffers which were unique to each node and not accessible to the other nodes. If a node required an information transfer with another node, the initiating node essentially had to request the host to perform the transfer, which pre-empted the host from performing other operations.

SUMMARY OF THE INVENTION

The invention provides a new and improved communications mechanism for facilitating communications among diverse nodes connected to a host in a heterogeneous distributed digital data processing system.

In brief summary, the communications mechanism includes a common queue buffer which is used to contain message queues for all of the nodes in the system. To perform an information transfer, a node inserts a message into an entry into the queue of the receiving node. If the message indicates a transfer of data, it also identifies the location of a buffer containing the data. Upon retrieving the queue entry from its queue, the receiving node may retrieve the contents of the buffer. The queue buffer is identified by a common descriptor block which is accessible by all of the nodes in the system.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 2A through 2C are data structures used in connection with the communications mechanism;

FIGS. 3A–3E depict details of control and status registers used in connection with the communications mechanism; and FIGS. 4A-1, 4A-2, 4B-1, 4B-2 depict flow diagrams detailing the operations of the new communications mechanism.

DETAILED DESCRIPTION OF AN ILLUSTRATIVE EMBODIMENT

1. General Description

Figure 1:
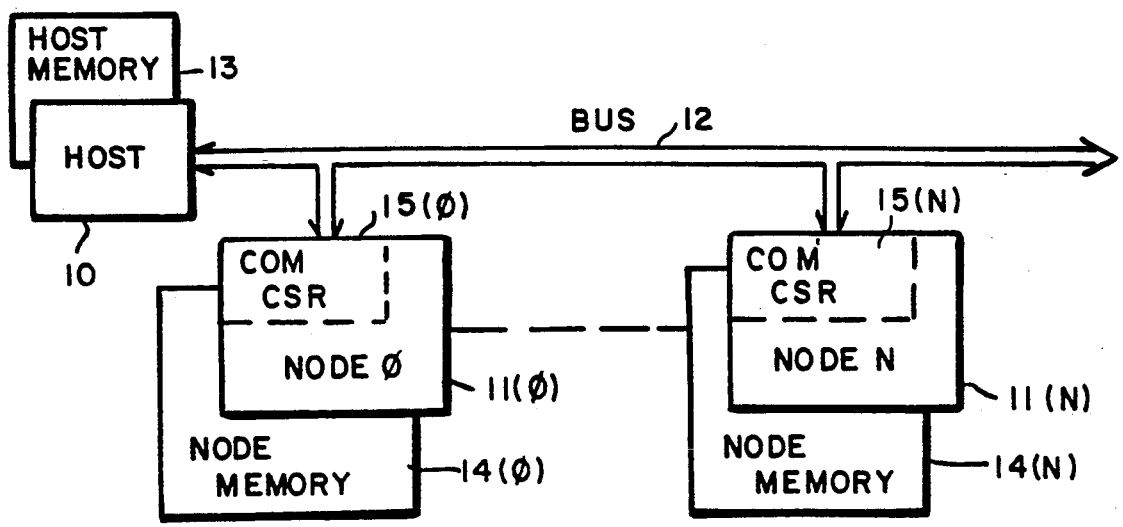
FIG. 1 is a general block diagram of a digital data processing system incorporating a communications mechanism in accordance with the invention.

FIG. 1 depicts a general block diagram of a digital data processing system incorporating a communications mechanism in accordance with the invention. With reference to FIG. 1, the digital data processing system includes a host 10 and a plurality of nodes 11(0) through 11(N) (generally identified by reference numeral 11) interconnected by a bus 12. As is conventional, the host includes a host processor (not shown) with an associated host memory 13 which serve to initialize and provide services to the nodes 11. The nodes 11 may also include processors, intelligent mass data storage subsystems, network adapters and the like. At least some of the nodes may have an associated node memory 14(0) through 14(N) (generally identified by reference numeral 14). Each node 11 also has a set of communications control and status registers 15(0) through 15(N) (generally identified by reference numeral 15). The contents of each set of control and status registers 15 are described below in connection with FIG. 3.

As is conventional, the host memory 13 may be accessed by a host processor (not shown), and it may also be accessed by the nodes 11 by read or write information transfers over bus 12. That is, words of information may be written to, or read from, the host memory 13 by the host processor, and words of information may also be written to or read from the host memory 13 by the nodes 11. (A word is the number of bits of information, typically sixteen, thirty two or sixty four bits, which may be transferred over the bus 12 at one time.) In addition, in one specific embodiment, at least some of the node memories 14 can be accessed, by means of transfers over bus 12, by nodes 11 other than the node 11 with which each is associated. In initiating the transfer of a word of information over the bus 12 the initiating unit transmits an address over the bus. The range of addresses which may be transmitted over bus 12 defines a physical address space which identifies locations in the host memory 13 and in the node memories 14 which may be accessed over bus 12. In one embodiment, each of the nodes 11 and the host 10 is also identified by a node identification number which is used in connection with transfers over bus 12.

The communications mechanism in accordance with the invention facilitates transfers of blocks o information among nodes 11 over bus 12. Each block comprises one or more individual words of information. Before proceeding further with a description of the operation of the communications mechanism, it would be helpful to first describe the various data structures which are used in connection with the communications mechanism and the various communications control and status registers 15. The data structures are described in Part 2 below in connection with FIGS. 2A through 2C and the communications control and status registers 15 are described in Part 3 below in connection with FIG. 3.

2. Data Structures

Figure 2C:
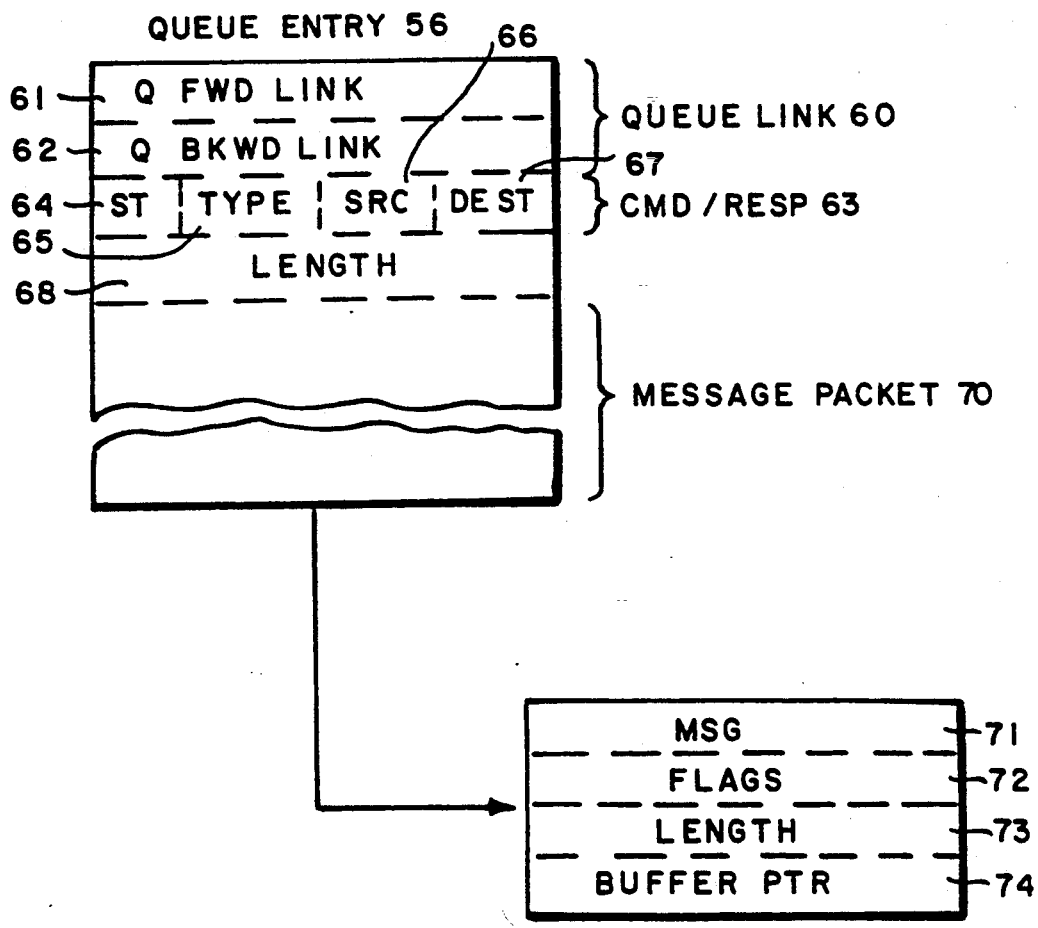

The communications mechanism includes several data structures, which are depicted in FIGS. 2A through 2C, and which are maintained by the host 10 in the host memory 13. In particular, the host 10 maintains in host memory 13 a system descriptor block 20, shown in detail in FIG. 2A, which contains information as to the locations, in host memory 13, of a queue buffer 21, which will be described below in connection with FIGS. 2B and 2C. The host 10 identifies the location of the system descriptor block 20 in host memory 13 by loading the address of the base of the system descriptor block 20 into the communications control and status registers 15 in the nodes 11 on initialization. Thereafter, as described below, the nodes 11 may access information in the system descriptor block 20 over bus 12, and based on the information retrieved therefrom, access the queue buffer 21.

A. System Descriptor Block 20 (FIG. 2A)

With reference to FIG. 2A, the system descriptor block 20 comprises a header 30 and a plurality of node entries 31(0) through 31(N) (generally identified by reference numeral 31) each associated with one of the nodes 11(0) through 11(N). The header 30 includes a number of fields. As noted above, the system descriptor block 20 identifies the location in host memory 13 of the queue buffer 21; this information is maintained in a queue buffer base address field 32 and a queue buffer length field 33.

The queue buffer base address field 32 is a pointer to the base of the queue buffer 21. That is, the queue buffer base address field 32 contains the address of the base of the queue buffer 21. The queue buffer length field 33 contains a value which identifies the length of the queue buffer 21. Together, the queue buffer base address field 32 and the queue buffer length field 33 form a queue buffer descriptor.

The system descriptor block header 30 also contains a queue entry length field 34. As described below in connection with FIG. 2B, the queue buffer 21 includes a plurality of queue entries, all of which have the same length and the queue entry length field 34 identifies the length of an individual queue entry.

The header 30 of the system descriptor block 20 also includes several housekeeping fields. A system descriptor block length field 35 identifies the length of the system descriptor block 20 in host memory 13. A version number field 36 identifies a version number of the communications mechanism. As noted above, in one embodiment, the host has an associated node identification number, which is stored in a host node identification field 37 in the system descriptor block 20. In addition, in one embodiment, programs use conventional virtual addresses which are translated into physical addresses for transfers over bus 12. Fields 40 and 41 of the system descriptor block 20 contain the physical address and virtual address, respectively, of the system descriptor block 20, specifically of the base of the system descriptor block 20, which corresponds to field 35. The nodes 11 may use the contents of fields 40 and 41 to verify that the system descriptor block 20 is properly loaded in host memory 13; an error may be noted by the nodes 11 to the host 10 if the translated contents of virtual address field 41 do not correspond to the contents of the physical address field 40.

The fields in the various node entries 31 are all the same (although the contents of the fields in the node entries 31 may differ), and so the fields of only node entry 31(0) will be described in detail. As described below in connection with FIG. 2B, the queue buffer 21 maintains one or more free queues, and the node entry 31 includes a free queue number field 42 which contains a value that identifies the number of free queues and a free queue index field 43 which contains a value which will be described below in connection with FIG. 2B.

In addition, in the embodiment in which programs use virtual addresses, a node entry 31 contains a system page table descriptor 45 and a global page table descriptor 46. The system page table descriptor 45 contains two fields, one containing the base address and the other the length of the system page table. The system page table contains information for translating certain virtual addresses, most particularly those relating to processing of operating system programs, into physical addresses. The global page table descriptor 46 also contains two fields, one for the base address and the other for the length, of the global page table, which is used to facilitate sharing of information among programs.

B. Queue Buffer 21 (FIGS. 2B and 2C)

The queue buffer 21 is used by each of the nodes 11 to transmit to the other nodes messages, which may include data transfer commands and responses, as described below. The queue buffer 21 effectively maintains, in one buffer, separate queues for each of the nodes 11 and one or more free queues. The free queue is a source of queue entries which may be appended by the nodes 11 to their respective queues as described below.

The queue buffer 21 comprises a queue buffer header 50 at the beginning of the buffer followed by a queue buffer body 51 which contains a plurality of queue entries 56(0) through 56(M) (generally identified by reference numeral 56). The queue buffer header 50 comprises a plurality of queue headers 52(0) through 52(N) (generally identified by reference numeral 52) each associated with one of the nodes 11 and a free queue header 53 for each free queue. Each node 11 uses the queue header 52 which corresponds to the node's node number in the system depicted on FIG. 1.

FIG. 2B depicts a queue buffer 21 having one free queue and one free queue header 53. If the queue buffer 21 has more than one free queue, the queue buffer header 50 has one free queue header 53 for each free queue. Each queue header 52 and 53 in the queue buffer 21 comprises two entries, namely, a forward link, generally identified by reference numeral 54, and a backward link, generally identified by reference numeral 55. FIG. 2B depicts in detail the forward link 54(0) and backward link 55(0) for queue (0) header 52(0).

As described above in connection with the system descriptor block 20 in FIG. 2A, each node entry 31 includes a free queue number field 42 and a free queue index field 43. The contents of the free queue number field 42 generally identifies the number of free queues and the contents of the free queue index field 43 generally identifies number of queue headers in queue buffer header 50 preceding the first free queue header 53 so as to thereby identify the first free queue header 53 in the queue buffer header 50. Alternatively, the contents of the free queue index field 43 identifies the first free queue header 53 which the node 11 is to use and the free queue number field 52 identifies the number of free queues which the node 11 may use.

As will be described below in connection with FIG. 2C, each of the queue entries 56 in the queue buffer body also includes queue link information including a queue forward link field and a queue backward link field. The contents of the forward link field 54 in a queue header 52 or 53 points to a queue entry 56 in queue body 51 which is the first entry in the queue associated with that queue header 52 or 53. The contents of the forward link field in the first queue entry 56 points to the queue entry 56 which is the next entry in the queue, and so on. The contents of the queue backward link field in each queue entry points to the preceding entry in the queue, and the contents of the queue backward link field 55 in a queue header 52 or 53 points to the last entry in the queue associated with the queue header 52 or 53. The pointers in the forward link field 54 and backward link field 55 in the queue headers 52 and 53 and in the queue entries 56 may be either addresses or offsets from the base of the queue buffer 21.

The operations performed by the nodes 11 in manipulating the queues defined by the queue headers 52 and 53, and of linking queue entries to the various queues will be described below in connection with a description of the operation of the communications mechanism.

The detailed structure of each queue entry 56 is depicted in FIG. 2C. With reference to FIG. 2C, each queue entry 56 begins with the entry's queue link 60, which includes the forward link field 61 and backward link field 62. Following the queue link is a command/response field 63 which, in turn includes four fields, namely, a status field 64, a type field 65, a source field 66 and a destination field 67. The status field 64 indicates success or failure of the message transfer. The contents of the type field 65 identifies the type of command, that is, the direction of transfer of the message. The contents of the source field 66 and destination field 67 identify, by node number, the source and destination, respectively of the message. It will be appreciated that the source or destination of a message may be either a node 11 or the host 10.

Following the command/response field 63 is a length field, which indicates the length of a message packet 70 which follows in the queue entry 56. The contents of a message packet depends on the particular message being transmitted. FIG. 2C depicts the structure of a message packet 70 which may be used in connection with transfer of data between the source node and destination node (that is, the source or destination of the message packet 70 contained in the queue entry 56). In that case, the message packet includes a message field 71 indicating the direction of transfer of the data, that is, from the source node to the destination node or from the destination node to the source node.

A flags field 72 in the message packet 70 contains various flags relating to the transfer. A length field 73 identifies the amount of data to be transferred, and a buffer pointer field 74 identifies the location of the buffer which either contains the data, if the data transfer is to be from the message source to the message destination, or which is to receive the data if the data transfer is to be from the message destination to the message source. In one embodiment which uses virtual addresses, the flags field 72 may be used to indicate whether the contents of the buffer pointer 74 is a pointer to the buffer to be used in the data transfer, or a pointer to a buffer which, in turn, contains pointers to buffers to be used in the data transfer.

Alternatively, a message packet 70 which responds to the data transfer message described above may just include a message field indicating the receipt of the data and a flags field 72 indicating whether the data was properly transferred. In that case, the type field 65 indicates the success or failure of a message transfer, and the flags field 72 indicates the success or failure of the data transfer.

3. Communications Control And Status Registers

Each node 11 and the host 10 has a set of five communications control and status registers 15 which are used by the nodes 11 and host 10 to control communications. Each set of communications control and status registers 15 in a node 11 can be accessed directly by the corresponding node 11 and by the other nodes 11 and host 10 by conventional data transfers over bus 12. The communications control and status registers 15 in host 10 are accessible by all of the nodes 11. The five communications control and status registers 15 include a control register 100, an attention register 107, a status register 101, a data register 102 and an error register 103.

The control register 100 includes a single field for receiving a command from host 10. In one embodiment, the host 10 may issue commands to initialize the node 11 and allow it to begin message transfers, to stop transfers, to restart transfers, and to control access to the status register 101 and data register 102.

The attention register 107 includes a single field for receiving the identification of a node 11 or the host 10. If a queue in queue buffer 21 associated with a node 11 is empty, and then another node 11 or the host 10 inserts a queue entry 56 into the queue, the unit inserting the queue entry into the queue enters a value into the attention register 107 which corresponds to its node identification on bus 12. Similarly, if a queue in queue buffer 21 associated with the host 10 is empty and a node 11 inserts a queue entry 56 into the queue, the node 11 enters a value into the attention register 107 which corresponds to its node identification on bus 12. In either case, when a value is written into the attention register of a node 11 or the host 10, the node 11 or host 10 is interrupted to begin retrieving queue entries 56 from its queue as described below.

The status register 101 includes an update flag 110, which is used to synchronize access to the status register 101 by the node 11 and the host 10, a data flag 105 whose condition indicates whether the node 11 may use the contents of the data register 102, and a node status field 112 whose contents indicate the node's status, such as, for example, whether it has been initialized, whether an error has occurred, whether it attempted to obtain a queue entry 56 (FIG. 2B) from the free queue but the free queue was empty, and so forth. The status register update flag 110, when set by the node 11, indicates that the status register 101 has been updated. The status register update flag 110 is cleared by the host 10 when it retrieves the contents of the status register 101 and loads a command in the control register 100 indicating that it has retrieved the contents of the status register 101.

The host 10 uses the data register 102 to provide the base address of the system descriptor block 20 (FIG. 2A) to the node 11. Prior to initializing the node, the host 10 loads a command in the control register which reserves to it the use of the data register 102. In response to the command the node 11 sets the data flag 105. Thereafter, the host writes the base address of the system descriptor block 20 into the data register 102 and loads an initialization command in the control register 100. In response, the node initializes and clears the data flag 105.

The node 11 uses the error register 103 to report errors to the host 10. When an error occurs, the node 11 inserts an error code into the error register 103, provides an appropriate entry in the node status field 112 of the status register 101 if a command has been received from the host 10 allowing the node to update the status register 101, and sets the status register update flag 110. Thereafter the node 11 may transmit a conventional interrupt request over bus 12 to obtain service from the host 10, or the host 10 may poll to determine that the status register 101 has been updated.

4. Operation

With this background, the operation of the communications mechanism will be described in connection with FIGS. 4A-1 through 4B-2. Preliminarily, to initiate operations over the communications mechanism, the host 10 first establishes the various data structures, including the system descriptor block 20 (FIG. 2A) and queue buffer 21 (FIG. 2B). In addition, the host 10 loads the base address of the system descriptor block 20 into the data registers 102 of the nodes 11 and loads initialization commands in their control registers 100 (FIG. 3) to enable them to start operating. Thereafter, the nodes 11 may communicate by transferring messages through the queues in queue buffer 21, which may relate, as noted above, to transfers of data in buffers defined in the messages.

FIGS. 4A-1 and 4A-2 detail operations in inserting messages in queue entries 56 in the queues maintained in the queue buffer 21. This may occur following insertion of data into a buffer as described below, and so it will be assumed that the node 11 has been initialized and activated.

Initially, the node 11 which performs the insertion, identified in FIGS. 4A-1 and 4A-2 as node A, has the identification of both the source and destination nodes. With reference to FIG. 4A-1, node A first uses the base address of the system descriptor block 20 to initiate retrieval of the contents of the queue buffer base address field 32, the queue buffer length field 33 and the queue entry length field 34 in the system descriptor block 20 (step 170). In addition, node A retrieves the contents of the free queue number field 42 and the free queue index field 43 from the node entry 31 associated with the node 11 whose queue is to receive the command or response, which is identified as node B.

Node A then retrieves node B's queue header 52 and the queue header 53 of the free queue. The free queue supplies an empty queue entry which 56 node A links to node B's queue and into which node A inserts the command or response. Specifically, using the base address of the queue buffer 21 from queue buffer base address field 32 and node B's identification, node A then retrieves the contents of node B's queue header 52 (step 171). Node B's node identification essentially forms an index into the queue buffer header 50 which node A uses to identify node B's queue header 52.

Using the queue buffer base address and the contents of the free queue index 43 which node A retrieved (in step 170) from node B's node entry 31, node A then retrieves the free queue header 53 (step 172) and determines if it has any queue entries 56 (step 173). In one embodiment, a queue is empty, that is, it has no queue entries 56 if both the backward link 54 and forward link 55 in its header 53 are zero. If the free queue is empty, and if the contents of the free queue number field 42 retrieved from node B's node entry 31 identifies one free queue, node A sequences to step 174 to indicate an error, as described above (step 174).

If in step 173 a free queue is identified which is not empty, node A sequences to step 175 to load a message into the first queue entry 56 in the free queue (step 175). The first queue entry 56 is the queue entry 56 pointed to by the forward link 54 in the free queue header 53. Node A, after determining from the contents of node B's queue header whether node B's queue is empty, then proceeds to link the queue entry 56 to the tail of node B's queue by conditioning node B's queue header 52, the free queue header 53, and the appropriate queue links in the various queue entries 56 to link the queue entry 56 (step 176).

In particular, since the queue entry 56 is being removed from the head of the free queue, the forward link 54 of the free queue header 53 must be modified to point to the second queue entry (which, after removal of the first free queue entry for linkage to node B's queue, will be the first queue entry 56 in the free queue). The backward link 62 of the queue link of the second queue entry 56 in the free queue must also be modified to point to the free queue header 53. In addition, if the queue entry 56 is being linked at the tail end of node B's queue, the forward link 61 of the queue entry 56 which was previously at the tail end of node B's queue (or the forward link 54 of the queue header 52 if node B's queue was empty) must be modified to point to the new queue entry 56. In addition, the backward link 55 of the queue header 52 must be modified to point to the new last queue entry 56. Finally, the queue link 60 of the queue entry 56 being linked to node B's queue must be modified. Specifically, the forward link 61 of the new queue entry 56 must be modified to point to node B's queue header 52, and its backward link 62 must be modified to point to the queue entry 56 which was previously at the tail end of the queue, and which was previously identified by the backward link 55 of node B's queue header.

After the new queue entry 56 is linked into node B's queue in step 176, node A sequences to step 177 (FIG.

4A-2), in which it determines whether node B's queue was empty prior to step 176. If it was empty, that is, if node A inserted a queue entry 56 into a previously empty queue, node A loads a value into node B's attention register 107 thereby interrupting node B and, as described below in connection with FIGS. 4B-1 and 4B-2, enabling it to retrieve the new queue entry 56 from its queue (step 178). After conditioning node B's queue entry 56, it exits the insertion routine depicted in FIGS. 4A-1 and 4A-2 (step 179). If node B's was not previously empty, node A sequences directly to step 179 to exit.

As described above in connection with FIGS. 4A-1 and 4A-2, if node A conditions node B's attention register 107 (FIG. 3) in node B's communications control and status registers 15 after inserting a queue entry onto node B's queue, node B, if previously initialized, begins retrieving queue entries from its queue and processing them. If node B's queue was not empty when node A inserted a queue entry on node B's queue, node A does not condition node B's attention register, but node B, in iteratively retrieving and processing queue entries from its queue, will, unless previously stopped by a command loaded by host 10 in its control register 100, eventually retrieve and process the queue entry inserted by node A onto its queue. In either case, node B performs the sequence depicted in FIGS. 4B-1 and 4B-2 to retrieve and process the queue entry 56. With reference to FIG. 4B-1, node B first verifies that the host has initialized it so that it is operating over the communications facility (step 190). If not, node B waits until it is initialized. When node B is finally initialized, it sequences to step 191 in which it tests the attention register 107 in its communications control and status registers 15. If a value has not been loaded into the attention register, node B returns to step 190.

If, in step 191, the node attention register 107 contains a non-zero value, node B accesses its queue to retrieve a queue entry 56 for processing. Node B sequences to step 192 in which it uses the base address of the system descriptor block 20, which is in its data register 102, to retrieve the contents of the queue buffer base address field 32, the queue buffer length field 33 and the queue entry length field 34. In addition, node B retrieves the contents of the free queue number field 42 and free queue index field 43 in its node entry 31 in the system descriptor block 20.

Using the retrieved contents of the queue buffer base address field 32 and its node identification, node B then retrieves the contents of its queue header 52 from queue buffer header 50 (step 193). Node B then tests the contents of forward link 54 and backward link 55 to determine if the are both zero, in which case node B's queue is empty (step 194). If node B determines that its queue is empty, it returns to step 190 (FIG. 4B-1).

If, on the other hand, node B determines in step 194 that its queue is not empty, it sequences to step 197, in which it retrieves the contents of the queue entry 56 which is pointed to by the queue forward link 54 in its queue header 52, that is, the first queue entry 56 in its queue. Node B then links the queue entry 56 to the free queue (step 200). In this operation, node B performs operations similar to those described above in connection with step 176. Node B sequences to step 203 to process the message retrieved from the queue entry 56.

After node B processes the message retrieved in the queue entry 56 (step 203), it sequences to step 204 in which it determines whether the host 10 has loaded a command in its control register 100 enabling it to stop using the communications facility. If not, it tests its queue header 52 to determine if its queue is empty (step 205). If node B determines that its queue is not empty, it sequences to step 192 to retrieve and process the next queue entry 56. If node B determines in step 205 that its queue is empty, it sequences to step 190 to wait for another node 11 to load its attention register 107 indicating insertion of a queue entry 56 into its queue.

As noted above, the communications facility can be used to transfer message among diverse heterogeneous processors for many purposes. For example, the messages can be used to enable transfers of data among nodes 11 and host 10. In particular, if a node 11 or host 10 wishes to transmit data, it may create a buffer, load data into it, generate a message packet 70 (FIG. 2C) indicating the data transfer in message field 71 and location and size of the buffer in fields 72 through 74, and insert it into a queue entry 56 and link the queue entry into the queue in queue buffer 21 associated with the intended recipient as described above.

In addition, if a node 11 or host 10 wishes to enable another to transmit data to it, it generates an appropriate message packet 70 and inserts it into a queue entry and links the queue entry 56 into the appropriate queue in queue buffer 21 as described above. The other unit, either a node 11 or host 10, when it processes the queue entry 56, inserts data into a buffer, which may, but need not be, defined in the message packet which initiated the operation, and generates a message packet comprising a response. If the initiating message packet did not identify the buffer to be loaded with the data, the response message packet does identify the buffer, and the node 11 or host 10 receiving the response message packet may retrieve the data from the buffer.

It will be appreciated that, since the host 10 is also a node on bus 12, it may also communicate with the nodes 11 through the communications mechanism described above. In particular, since host 10 has a node identification number, it has a node entry 31 in system descriptor block 20 and a queue header 52 in queue buffer 21. Accordingly, the host 10 may transmit messages to, and receive them from, nodes 11 through the queues in the queue buffer 21.

It will also be appreciated that the communications mechanism provides efficient information transfer between nodes 11 without requiring any significant participation by host 10 after it initializes the data structures depicted in FIGS. 2A through 2C, other than in connection with handling of error recovery operations. Thus, the communications mechanism leaves the host 10 free to do other processing while the nodes 11 engage in information transfer.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A digital data processing system, comprising
a plurality of nodes for performing processing tasks,
one of said nodes being a host connected to every other node and having local access to a host memory, for initializing, in said host memory, a plurality of memory structures for storing entries containing information transfer commands, each memory structure being associated with one of said nodes, and for performing other processing tasks, each of said nodes, including said host, being arranged to initiate a transfer of information, by generating an entry containing an information transfer command, and by inserting said entry directly into a memory structure in said host memory associated with another node, each of said nodes other than said host being arranged to insert said entry directly into said memory structure without assistance from said host, thereby leaving said host free to perform other processing tasks and communicate with other nodes, each of said nodes, including said host, being arranged to retrieve an entry from a memory structure in said host memory with which said node is associated, and to participate in a transfer of information in accordance with an information transfer command contained in said entry.

2. A system as defined in claim 1 wherein said host initializes in said host memory a system descriptor blocking containing information from which said nodes can identify locations, in said host memory, of memory structures for storing entries, each node comprises a data register for storing a base address of said system descriptor block, and said host loads said base address of said system descriptor block into said data register of each node.

3. A system as defined in claim 1 wherein each node comprises a control register for storing at least one command from said host, and said host is arranged to load commands into said control registers of said nodes.

4. A system as defined in claim 3 wherein said at least one command comprises an initialization command to allow a node to begin transfers of information, a command to stop transfers of information, and a command to resume transfers of information.

5. A system as defined in claim 1 wherein, when an error occurs, a node notifies said host of said error, in order to obtain service from said host.

6. A system as defined in claim 5 wherein each node comprises an error register into which said node inserts an error code when an error occurs, said error code identifying said error, and each node comprises a status register into which said node inserts an indication of occurrence of an error in order to report said error to said host.

7. A system as defined in claim 1 wherein each node that retrieves an entry from a memory structure in said host memory with which said node is associated participates in a transfer of information with a node that initiated said transfer of information.

8. A system as defined in claim 7 wherein each of said nodes is arranged to initiate transfers of information both to and from said node, and said information transfer command indicates a direction of transfer.

9. A system as defined in claim 1 wherein said host initializes a queue buffer in said host memory, and said memory structures comprise queues located in said queue buffer.

10. A system as defined in claim 1 wherein each node comprises an attention register, and each node that inserts an entry an empty memory structure in said host memory associated with another node inserts a signal into an attention register of said another node to enable said another node to begin retrieving entries from said memory structure associated with said another node.

11. A system as defined in claim 10 wherein each node has an associated identification value, and said signal that said node inserts into said attention register comprises an identification value associated with said node.

12. A digital data processing system, comprising a plurality of nodes for performing processing tasks, and a host connected to each of said nodes and having local access to a host memory, for initializing, in said host memory, a plurality of memory structures for storing entries containing information transfer commands, each memory structure being associated with one of said nodes, and for performing other processing tasks, each of said nodes being arranged to initiate a transfer of information, by generating an entry containing an information transfer command, and by inserting said entry directly into a memory structure in said host memory associated with another node without assistance from said host, thereby leaving said host free to perform other processing tasks, each of said nodes being arranged to retrieve an entry from a memory structure in said host memory with which said node is associated, and to participate in a transfer of information in accordance with an information transfer command contained in said entry, wherein said host initializes a queue buffer in said host memory, and said memory structures comprise queues located in said queue buffer, said queue buffer comprises a queue buffer header comprising a plurality of queue headers each associated with a node, plurality of queue entries, said queue headers and queue entries each comprise a node queue link field to facilitate linking of said queue headers and queue entries into queues, and each node that inserts a new queue entry into a queue associated with another node utilizes a queue header associated with said another node in linking said new queue entry to said queue associated with said another node.

13. A system as defined in claim 12 wherein said node that inserts said new queue entry into said queue associated with another node utilizes a node queue link field of said queue header associated with said another node and node queue link fields of a succession of queue entries located in said queue associated with said another node to locate a last queue entry in said queue associated with said another node, and links said new queue entry to said last queue entry.

14. A system as defined in claim 13 wherein said node that inserts said new queue entry into said queue associated with another node links said new queue entry to said last queue entry by loading a pointer to said new queue entry into a node queue link field of said last queue entry, and by loading a pointer to said queue header associated with said another node into a node queue link field of said new queue entry, to thereby link said new queue entry to said queue associated with said destination node.

15. A system as defined in claim 12 wherein said queue buffer header comprises a free queue header comprising a free queue link field to facilitate linking of queue entries into a free queue located in said queue buffer body, and said node that inserts said new queue entry into said queue associated with another node identifies said free queue header, utilizes said node queue link field of said free queue header to locate a free queue entry in said free queue, unlinks said free queue entry from said free queue, inserts said new queue entry into said free queue entry, and links said free queue entry into said queue associated with said another node.

16. A system as defined in claim 12 wherein said queue buffer header comprises a plurality of free queue headers each comprising a free queue link field to facilitate linking of queues entries into a respective plurality of free queues, said host initializes in said host memory a system descriptor block for identifying a free queue corresponding to each node, said node that inserts said new queue entry into said queue associated with another node utilizes said system descriptor bloc, to identify a free queue associated with said another node, identifies a free queue header associated with said another node, utilizes a node queue link field of said free queue header to locate a free queue entry in said free queue, unlinks said free queue entry from said free queue, inserts said new queue entry into said free queue entry, and links said free queue entry into said queue associated with said another node.

17. A system as defined in claim 16 wherein said system descriptor block comprises a plurality of node entries each associated with a node, each node entry identifying a free queue, and said node that inserts said new queue entry into said queue associated with another node locates a node entry in said system descriptor block associated with said another node, and locates a free queue identified by said node entry.

18. A system as defined in claim 17, wherein each node in said system descriptor block comprises a free queue descriptor comprising a free queue pointer to a free queue header in said queue buffer header, and said node that inserts said new queue entry into said queue associated with another node locates said free queue header identified by said free queue pointer, and determines whether a free queue associated with said free queue header comprise a free queue entry.

19. A digital data processing system, comprising a plurality of nodes for performing processing tasks, and a host connected to each of said nodes and having local access to a host memory, for initializing, in said host memory, a plurality of memory structures for storing entries containing information transfer commands, each memory structure being associated with one of said nodes, and for performing other processing tasks, each of said nodes being arranged to initiate a transfer of information, by generating an entry containing an information transfer command, and by inserting said entry directly into a memory structure in said host memory associated with another node without assistance from said host, thereby leaving said host free to perform other processing tasks, each of said nodes being arranged to retrieve an entry from a memory structure in said host memory with which said node is associated, and to participate in a transfer of information in accordance with an information transfer command contained in said entry, wherein said host initializes a queue buffer in said host memory, and said memory structures queues located in said queue buffer, said queue buffer comprises a queue buffer header comprising a plurality of queue headers each associated with a node, and a queue buffer body comprising a plurality of queue entries, said queue headers and queue entries each comprise a node queue link field to facilitate linking of said queue headers and queue entries into queues, and each of said nodes that retrieves an entry from a queue in said host memory with which said node is associated utilizes a queue header associated with said queue to retrieve said entry from said queue.

20. A digital data processing system, comprising a plurality of nodes for performing processing tasks, and a central memory for storing entries in a plurality of memory structures, each of said memory structures being associated with one of said nodes, each of said nodes comprising a processor, and a nodal memory comprising at least one data buffer for storing a block of data, said processor having local access, exclusive of other processors in other nodes, to said nodal memory, said processor being arranged to initiate a transfer of a block of data directly between said nodal memory to which said processor has local access and another node by generating an entry identifying a data buffer in said nodal memory to which said processor has local access, and by inserting said entry into a memory structure in said central memory associated with said another node, said processor being arranged to retrieve an entry from a memory structure in said central memory with which said node comprising said processor is associated, and to particulate in a transfer of a block of data directly between said node and a data buffer identified in said entry and located in a nodal memory to which another node has local access.

21. A system as defined in claim 20 wherein each node that retrieves an entry from a memory structure in said central memory with which said node is associated participates in a transfer of information with a data buffer located in a nodal memory of a node that initiated said transfer of information.

22. A system as defined in claim 21 wherein each of said nodes is arranged to initiate transfers of information both to and from a data buffer located in a nodal memory of said node, by inserting a said entry into a memory structure associated with another node, said entry indicating a direction of transfer.

23. A system as defined in claim 20 wherein said entry identifying said data buffer comprises a point identifying a location of said data buffer and a length filed that identifies a size of said data buffer.

24. A system as defined in claim 20 wherein said central memory comprises a queue buffer, and said memory structures comprise queue located in said queue buffer.

25. A system as defined in claim 20 wherein each node comprises an attention register, and each node that inserts an entry into an empty memory structure in said central memory associated with another node inserts a signal into an attention register of said another node to enable said another node to being retrieving entries from said memory structure associated with said another node.

26. A system as defined in claim 25 wherein each node has an associated identification value, and said signal that said node inserts into said attention register comprises an identification value associated with said node.

27. A system as defined in claim 20 wherein said central memory comprises a system descriptor block containing information for which said nodes can identify locations, in said central memory, of memory structures for storing entries, and each node comprises a data register for storing a base address of said system descriptor block.

28. A digital data processing system, comprising a plurality of nodes for performing processing tasks, and a central memory for storing entries in a plurality of memory structures, each of said memory structures being associated with one of said nodes, each of said nodes comprising
a processor,
and a nodal memory comprising at least one data buffer for storing a block of data,
said processor having local access, exclusive of other processors in other nodes, to said nodal memory,
said processor being arranged to initiate a transfer of a block of data between said nodal memory and another node by generating an entry identifying a data buffer in said nodal memory, and by inserting said entry into a memory structure in said central memory associated with said another node,
said processor being arranged to retrieve an entry from a memory structure in said central memory with which said node comprising said processor is associated, and to participate in a transfer of a block of data between said node and a data buffer identified in said entry, wherein
said central memory comprises a queue buffer,
said memory structures comprise queues located in said queue buffer,
said queue buffer comprises
a queue buffer header comprising a plurality of queue headers each associated with a node,
and a queue buffer body comprising a plurality of queue entries,
said queue headers and queue entries each comprise a node queue link field to facilitate linking of said queue headers and queue entries into queues,
and each node that inserts a new queue entry into a queue associated with another node utilizes a queue header associated with said another node in linking said new queue entry to said queue associated with said another node.

29. A system as defined in claim 28 wherein said node that inserts said new queue entry into said queue associated with another node utilizes a node queue link field of said queue head associated with said another node and node queue link fields of a succession of queue entries located in said queue associated with said another node to locate a last queue entry in said queue associated with said another node, and links said new queue entry to said last queue entry.

30. A system as defined in claim 29 wherein said node that inserts said new queue entry into said queue associated with another node links said new queue entry to said last queue entry by loading a point to said new queue entry into a node queue link field of said last queue entry, and by loading a pointer to said queue header associated with said another node into a anode queue link field of said new queue entry, to thereby link said new queue entry to said queue associated with said destination node.

31. A system as defined in claim 28 wherein
said queue buffer header comprises a free queue header comprising a free queue link field to facilitate linking of queue entries into a free queue located in said queue buffer body,
and said node that inserts said new queue entry into said queue associated with another node identifies said free queue header, utilizes said node queue link field of said free queue header to locate a free queue entry in said free queue, unlinks said free queue entry from said free queue, inserts said new queue entry into said free queue entry, and links said free queue entry into said queue associated with said another node.

32. A system as defined in claim 28 wherein
said queue buffer header comprises a plurality of free queue headers each comprising a free queue link field to facilitate linking of queue entries into a respective plurality of free queues,
said central memory comprises a system descriptor block for identifying a free queue corresponding to each node,
said node that inserts said new queue entry into said queue associated with another node utilizes said system descriptor block to identify a free queue associated with said another node, identifies a free queue header associated with said another node, utilizes a node queue link field of said free queue head to located a free queue entry in said free queue, unlinks said free queue entry from said free queue, inserts said new queue entry into said free queue entry, and links said free queue entry into said queue associated with said another node.

33. A system as described in claim 32 wherein
said system descriptor block comprises a plurality of node entries each associated with a node, each node entry identifying a free queue,
and said node that inserts said new queue entry into said queue associated with another node locates a node entry in said system descriptor block associated with said another node, and locates a free queue identified by said node entry.

34. A system as defined in claim 33, wherein
each node entry in said system descriptor block comprises a free queue descriptor comprising a free queue pointer to a free queue header in said queue buffer header,
and said node that inserts said new queue entry into said queue associated with another node locates said free queue header identified by said free queue pointer, and determines whether a free queue associated with said free queue header comprises a free queue entry.

35. A digital data processing system, comprising
a plurality of nodes for performing processing tasks,
and a central memory for storing entries in a plurality of memory structures, each of said memory structures being associated with one of said nodes,
each of said nodes comprising
a processor,
and a nodal memory comprising at least one data buffer for storing a block of data,
said processor having local access, exclusive of other processors in other nodes, to said nodal memory,
said processor being arranged to initiate a transfer of a block of data between said nodal memory and another node by generating an entry identifying a data buffer in said nodal memory, and by inserting said entry into a memory structure in said central memory associated with said another node,
said processor being arranged to retrieve an entry from a memory structure in said central memory with which said node comprising said processor is associated, and to participate in a transfer of a block of data between said node and a data buffer identified in said entry, wherein
said central memory comprises a queue buffer,
said memory structures comprise queues located in said queue buffer,
said queue buffer comprises
a queue buffer header comprises a plurality of queue headers each associated with a node,
and a queue buffer body comprising a plurality of queue entries,
said queue headers and queue entries each comprise a node queue link field to facilitate linking of said queue headers and queue entries into queues,
and each of said nodes that retrieves an entry from a queue in said central memory with which said node is associated utilizes a queue header associated with said queue to retrieve said entry from said queue.

36. A digital data processing system, comprising
a plurality of nodes for performing processing tasks,
one of said nodes being a host connected to every other node and having local access to a host memory, for creating in said host memory a plurality of memory structures for storing entries, each of said memory structures being associated with one of said nodes, and for performing other processing tasks,
each of said nodes, including said host, comprising
a processor,
and a nodal memory comprising at least one data buffer for storing a block of data,
said processor having local access, exclusive of other processors in other nodes, to said nodal memory,
said processor being arranged to initiate a transfer of a block of data directly between said nodal memory to which said processor has local access and another node by generating an entry identifying a data buffer in said nodal memory to which said processor has local access, and by inserting said entry directly into a memory structure in said host memory associated with said another node,
said processor being arranged to retrieve an entry from a memory structure in said host memory with which said node comprising said processor is associated, and to particulate in a transfer of a block of data directly between said node and a data buffer identified in said entry and located in a nodal memory to which another node has local access,
each of said nodes other than said host being arranged to initiate a transfer of a block of data by inserting said entry directly into said memory structure without assistance from said host, thereby leaving said host free to perform other processing tasks and communicate with other nodes.

37. A system as defined in claim 36 wherein said host is a said node arranged to initiate and participate in transfers of information.

38. A node for use in a digital data processing system comprising a plurality of nodes, one of said nodes being a host connected to every other node, said host having local access to a host memory and being arranged to initialize, in said host memory, a plurality of memory structures for storing entries containing information transfer commands, each of said memory structures being associated with one of said nodes, said node comprising
a processor for performing processing tasks,
and a nodal memory for storing information,
said node being arranged to initiate a transfer of information, by generating an entry containing an information transfer command, and by inserting said entry directly into a memory structure in said host memory associated with another node without assistance from said host, thereby leaving said host free to perform other processing tasks and communicate with other nodes,
said node being arranged to retrieve an entry from a memory structure in said host memory with which said node is associated, and to participate in a transfer of information in accordance with an information transfer compound contained in said entry,
said host being arranged to initiate a transfer of information and to retrieve an entry from a memory structure in said host memory in the same manner as said node.

39. A node for use in a digital data processing system comprising a central memory connected to a plurality of nodes, said central memory being arranged to store entries in a plurality of memory structures, each of said memory structures being associated with one of said nodes, said node comprising
a processor for performing processing tasks,
and a nodal memory comprising at least one data buffer for storing a block of data,
said processor having local access, exclusive of other processors in other nodes, to said nodal memory,
said processor being arranged to initiate a transfer of a block of data directly between said nodal memory to which said processor has local access and another node by generating an entry identifying a data buffer in said nodal memory to which said processor has local access, and by inserting said entry into a memory structure in said central memory associated with said another node,
said processor being arranged to retrieve an entry from a memory structure in said central memory with which said node comprising said processor is associated, and to participate in a transfer of a block of data directly between said node and a data buffer identified in said entry and located in a nodal memory to which another node has local access.

40. A host for use in a digital data processing system comprising a plurality of nodes for performing processing tasks, said plurality of nodes comprising said host, said host comprising a host memory, and a host processor, connected to each of said nodes and having local access to said host memory, for initializing, in said host memory, a plurality of memory structures for storing entries containing information transfer commands, each of said memory structures being associated with one of said nodes, and for performing other processing tasks and communicating with other nodes, said host memory being arranged to receive and store an entry generated by a node in order to initiate a transfer of information, said entry containing an information transfer command, said host memory being arranged to enable said node to insert said entry directly into a memory structure associated with another node without assistance from said host, thereby leaving said host free to perform other processing tasks, said host memory being arranged to permit a node to retrieve an entry from a memory structure in said host memory with which said node is associated, in order to enable said node to participate in a transfer of information in accordance with an information transfer command contained in said entry, said host being arranged to initiate a transfer of information and to retrieve an entry from a memory structure in said host memory in the same manner as other nodes.

41. A host for use in a digital data processing system comprising a plurality of nodes for performing processing tasks, each of said nodes having local access, exclusive of other nodes, to a respective one of a plurality of nodal memories, said host comprising a host memory for storing entries in a plurality of memory structures, each of said memory structures being associated with one of said nodes, and a host processor for performing processing tasks, said host processor having local access to said host memory, said host memory being arranged to receive and store an entry generated by a node in order to initiate a transfer of a block of data directly between a nodal memory to which said node has local access and another node, said entry identifying a data buffer in said nodal memory to which said node has local access, said entry being inserted into a memory structure associated with said another node, said host memory being arranged to permit a node to retrieve an entry from a memory structure in said host memory with which said node is associated, in order to enable said node to participate in a transfer of a block of data directly between said node and a data buffer identified in said entry and located in a nodal memory to which another node has local access.

42. A digital data processing system comprising a host connected to a plurality of nodes, said host including a queue buffer, the queue buffer including a plurality of queues with each queue being associated with a node, said plurality of nodes including a plurality of information buffers, each node comprising:

A. destination node identification means for identifying a destination node to receive information;

B. information transfer means connected to said information buffers for transferring information between a source information buffer and a destination information buffer;

C. queue entry generation means, connected to said destination node identification means and said queue buffer, for generating a queue entry containing an information transfer command and for inserting said queue entry into said queue of said queue buffer associated with the identified destination queue; and D. queue entry processing means connected to said queue buffer for iteratively retrieving queue entries from the queue in said queue buffer associated with the node and for processing each retrieved queue entry, wherein said queue entry generation means includes:

a. a queue entry selection portion for selecting a queue entry;

b. a queue entry generation portion for loading an information transfer command in the queue entry selected by said queue selection portion; and c. a queue entry insertion portion for identifying a destination queue in said queue buffer associated with the identified destination node and for inserting the queue entry generated by said queue entry generating portion, said queue buffer comprises (i) a queue buffer header including a plurality of queue headers each associated with a node and (ii) a queue buffer body comprising a plurality of queue entries, the queue headers and queue entries each including a node queue link field to facilitate linking of said queue headers and queue entries into queues, said queue entry insertion portion using the queue header associated with the destination node in linking a queue entry generated by said queue entry generating portion to the queue associated with the destination node, and said queue buffer header further includes a free queue header including a free queue link field to facilitate linking of queue entries in said queue buffer body into a free queue, said queue entry selection portion selecting a queue entry from said free queue.

43. A system as defined in claim 42 in which said queue entry selection portion comprises:

A. a free queue header identification portion for identifying the free queue header;

B. a free queue entry identification portion responsive to identification of the queue header by said queue header identification portion for using the node queue link fields of said identifies free queue header to locate a free queue entry in the free queue; and C. a queue entry unlinking portion for unlinking the free queue entry identified by said free queue entry identification portion.

44. A system as defined in claim 42 in which said queue buffer header includes a plurality of free queue headers each including a free queue link field to facilitate linking of queue entries into a like plurality of free queues, said host further including a system descriptor block for identifying a free queue for each node, said queue entry selection portion using the system descriptor block to identify a free queue from which it selects a queue entry.

45. A system as defined in claim 44 in which said queue entry selection portion comprises:

A. a system descriptor block processor for processing said system descriptor block to identify a free queue associated with the destination node;

B. a free queue header identification portion for identifying the free queue header associated with the identified free queue;

C. a free queue entry identification portion responsive to identification of the queue header by said queue header identification portion for using the node queue link field of said identified free queue header to locate a free queue entry in the free queue; and D. a queue entry unlinking portion for unlinking the free queue entry identified by said free queue entry identification portion.

46. A system as defined in claim 45 in which said system descriptor block includes a plurality of node entries each associated with anode, each node entry identifying a free queue, said system descriptor block processor including:

A. a node entry locator for locating the node entry in the system descriptor block associated with the destination node; and B. a free queue locator for locating a free queue identified by the node entry located by said node entry locator.

47. A system as defined in claim 46, each node entry in said system descriptor block including a free queue descriptor including (i) a first free queue pointer to a free queue header in said queue buffer header and (ii) a length indicator, said free queue locator comprising:

A. a first free queue header locator responsive to said first fee queue pointer for locating the free queue header identified thereby;

B. a free queue determination portion for determining whether an identified free queue includes free queue entries;

C. a control portion for iteratively enabling said free queue determination portion, beginning with the free queue header identified by said first free queue header until either the free queue determination portion identifies a free queue that includes a free queue entry or until the number of iteration corresponds to the value identified by said length indicator.

48. A node for use in a digital data processing system comprising a host connected to a plurality of nodes, said host including a queue buffer, the queue buffer including a plurality of queues with each queue being associated with a node, said plurality of nodes including a plurality of information buffers, each node comprising:

A. a destination node identification means for identifying a destination node to receive information;

B. information transfer means for connection to said information buffers for transferring information between a source information buffer and a destination information buffer; and C. queue entry generation means connected to said destination node identification means and for connection to said queue buffer, for generating a queue entry containing an information transfer command and for inserting said queue entry into said queue of said queue buffer associated with the identified destination queue, wherein said queue entry generation means includes:

a. a queue entry selection portion for selecting a queue entry;

b. a queue entry generating portion for loading an information transfer command in the queue entry selected by said queue entry selection portion; and c. a queue entry insertion portion for identifying a destination queue in said queue buffer associated with the identified destination node and for inserting the queue entry generated by said queue entry generating portion, said queue buffer comprises (i) a queue buffer header including a plurality of queue headers each associated with a node and (ii) a queue buffer body comprising a plurality of queue entries, the queue headers and queue entries each including a node queue link field to facilitate linking of said queue headers and queue entries into queues, said queue entry insertion portion using the queue header associated with the destination node in linking a queue entry generated by said queue entry generating portion to the queue associated with the destination node, and said queue buffer header further includes a free queue header including a free queue link field to facilitate linking of queue entries in said queue buffer body into a free queue, said queue entry selection portion selecting a queue entry from said free queue.

49. A node as defined in claim 48 in which said queue entry selection portion comprises:

A. a free queue header identification portion for identifying the free queue header;

B. a free queue entry identification portion responsive to identification of the queue header by said queue header identification portion for using the node queue link fields of said identified free queue header to locate a free queue entry in the free queue; and C. a queue entry unlinking portion for unlinking the free queue entry identified by said free queue entry identification portion.

50. A node as defined in claim 48 in which said queue buffer header includes a plurality of free queue headers each including a free queue link field to facilitate linking of queue entries into a like plurality of free queues, said host further including a system descriptor block for identifying a free queue for each node, said queue entry selection portion using the system descriptor block to identify a free queue from which it selects a queue entry.

51. A node as defined in claim 50 in which said queue entry selection portion comprises:

A. a system descriptor block processor for processing said system descriptor block to identify a free queue associated with the destination node;

B. a free queue header identification portion for identifying the free queue header associated with the identified free queue;

C. a free queue entry identification portion responsive to identification of the queue header by said queue header identification portion for using the node queue link fields of said identified free queue header to locate a free queue entry in the free queue; and D. a queue entry unlinking portion for unlinking the free queue entry identified by said free queue entry identification portion.

52. A node as defined in claim 51 in which said system descriptor block includes a plurality of node entries each associated with a node, each node entry identifying a free queue, said system descriptor block processor including:

A. a node entry locator for locating the node entry in the system descriptor block associated with the destination node; and B. a free queue locator for locating a free queue identified by the node entry located by said node entry locator.

53. A node as defined in claim 52, each node entry in said system descriptor block including a free queue descriptor including (i) a first free queue pointer to a free queue header in said queue buffer header and (ii) a length indicator, said free queue locator comprising:

A. a first fee queue header locator responsive to said first free queue pointer for locating the free queue header identified thereby;

B. a free queue determination portion for determining whether an identified free queue includes free queue entries;

C. a control portion for iteratively enabling said free queue determination portion, beginning with the free queue header identified by said first free queue header until either the free queue determination portion identifies a free queue that includes a free queue entry of until the number of iterations corresponds to the value identified by said length indicator.

* * * * *

UNITED STATES PATENT AND TRADEMARK OFFICE
CERTIFICATE OF CORRECTION

PATENT NO.   : 5,136,718

DATED        : August 4, 1992

INVENTOR(S)  : Robert J. Haydt

It is certified that error appears in the above-identified patent and that said Letters Patent is hereby corrected as shown below:

Col. 3, line 3, after "12" insert --,--;

Col. 3, line 13, replace "o" with --of--;

Col. 5, line 17, after "identifies" insert --the--;

Col. 8, line 10, replace "entry which 56" with --entry 56 which--;

Col. 9, line 28, after "queue entre 56." start a new paragraph;

Col. 9, line 33, after "191" insert --,--;

Col. 13, line 24, replace "bloc" with --block--;

Col. 14, line 65, replace "filed" with --field--;

Col. 15, line 9, replace "being" with --begin--;

Col. 16, line 12, replace "anode" with --node--;

UNITED STATES PATENT AND TRADEMARK OFFICE
CERTIFICATE OF CORRECTION

PATENT NO. : 5,136,718
DATED : August 4, 1992
INVENTOR(S) : Robert J. Haydt

It is certified that error appears in the above-indentified patent and that said Letters Patent is hereby corrected as shown below:

Column 20, line 53, replace "identifies" with --identified--;

Signed and Sealed this

Twenty-ninth Day of November, 1994

Attest:

BRUCE LEHMAN

Attesting Officer

Commissioner of Patents and Trademarks